United States Patent [19]

Johnston

[11] 4,002,085
[45] Jan. 11, 1977

[54] ACCELERATOR CONTROL ASSEMBLY
[75] Inventor: Daniel U. Johnston, Anderson, Ind.
[73] Assignee: General Motors Corporation, Detroit, Mich.
[22] Filed: May 8, 1975
[21] Appl. No.: 575,610
[52] U.S. Cl. .............................. 74/513; 123/103 E
[51] Int. Cl.² ...................................... G05G 11/00
[58] Field of Search .................. 123/103 E; 74/513

[56] References Cited

UNITED STATES PATENTS

| 2,617,396 | 11/1952 | Ervin | 123/103 E |
| 2,737,166 | 3/1956 | Frick et al. | 123/103 E |
| 2,895,346 | 7/1959 | Arch | 74/513 X |
| 3,525,415 | 8/1970 | Bath et al. | 74/513 X |
| 3,643,639 | 2/1972 | Bier | 123/103 E |
| 3,869,937 | 3/1975 | Ahrens | 74/513 X |

Primary Examiner—Everette A. Powell, Jr.
Attorney, Agent, or Firm—Arthur N. Krein

[57] ABSTRACT

An accelerator control assembly for an automotive vehicle, the accelerator control assembly being mounted under the instrument panel of the vehicle and includes a pivotably supported lever arm carrying a bumper stop adjustably positioned to be engaged by an element of the accelerator pedal linkage during acceleration, a torsion spring being operatively connected to the lever arm to provide for increased pedal effort during full acceleration, a vacuum actuator being operatively connected to the lever arm to effect positioning of the bumper stop as a function of engine vacuum and a control lever is operatively connected to the lever arm to permit the operator to position the bumper stop between a power setting and an economy setting for engine operation, as desired.

5 Claims, 4 Drawing Figures

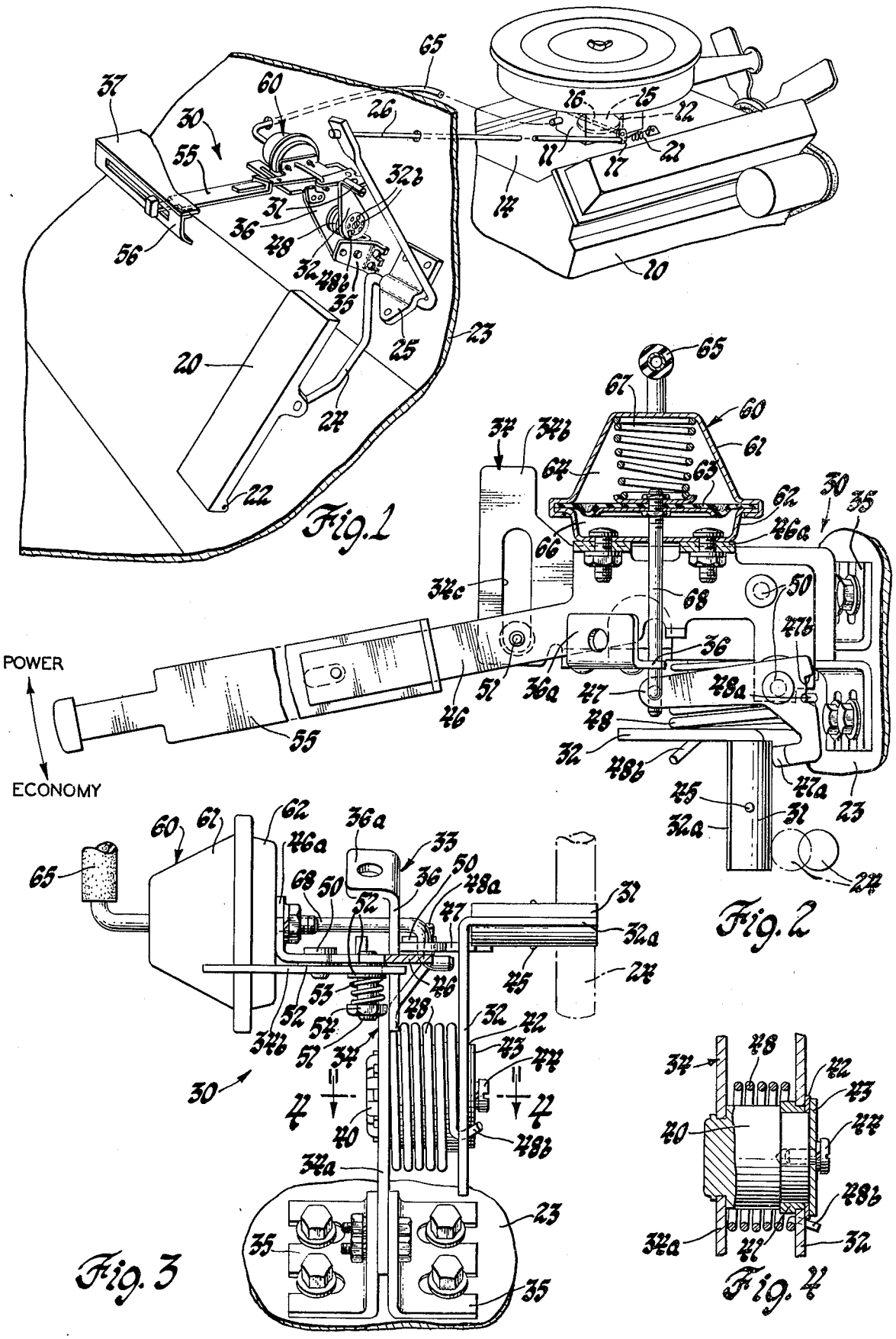

ACCELERATOR CONTROL ASSEMBLY

This invention relates to a throttle control for an automotive vehicle engine and, in particular, to an accelerator control assembly useful to permit a vehicle operator to obtain improved fuel economy.

Many automobile drivers operate the accelerator pedal much too rapidly during acceleration whereby the engine is not operated in the most economical manner. That is, the operator may effect a too rapid opening of the throttle valve which causes the manifold vacuum to drop below an efficient operating vacuum range. As is well known, an engine operates economically when the intake manifold vacuum is, for example, between 14 and 18.5 inches of mercury but, when the manifold vacuum drops below this range, the fuel consumption increases rapidly and, of course, the engine is then not operated in an economical manner.

In an effort to permit the average or unskilled driver to save fuel, various warning devices have been proposed which are operative to provide a visual signal to the driver to indicate, for example, when the vehicle is not being operated in an economical manner but, such a signal must be observed by the driver to be effective. In addition, various throttle control devices have been proposed to compensate for the erratic or sudden operation of the accelerator pedal by the vehicle operator as, for example, by applying a force to resist opening movement of the throttle under certain engine operating conditions but, in such known devices, this resistance force will increase proportionately with throttle opening movement.

It is therefore the principal object of this invention to improve an accelerator control assembly for use in an automotive vehicle whereby to provide an adjustable bumper stop which is also movable as a function of engine vacuum, into a position to engage the accelerator pedal linkage to provide a detent feel to the vehicle driver when the driver is accelerating at a maximum economical rate of fuel consumption.

Another object of this invention is to provide an accelerator control assembly to provide a physical signal through the accelerator pedal linkage to the operator of a motor vehicle to assist him in positioning the throttle of the carburetor for the engine so that the engine will not develop induction vacuum levels low enough to trigger the power-enrichment system of the carburetor.

A further object of this invention is to provide an improved accelerator control assembly for use in an automotive vehicle that provides a spring biased, detent bumper stop engageable with the vehicle accelerator pedal linkage which can be adjustably positioned, as desired, by the vehicle operator to suit his interest in either increased power or increased fuel economy during engine operation.

These and other objects of the invention are obtained by means of an accelerator control assembly including a mounting bracket pivotably supporting a lever arm carrying a bumper stop positioned in the path of travel of a lever forming part of the accelerator pedal linkage used to control operation of the throttle of the carburetor for the engine of a motor vehicle; a torsion spring being operatively connected to the lever arm to bias the bumper stop in a direction toward the lever. A vacuum actuator, operative as a function of engine vacuum, and a manual control lever are both operatively connected to the lever arm to vary the rotation position of the lever arm whereby the position of the bumper stop is varied.

For a better understanding of the invention, as well as other objects and further features thereof, reference is had to the following detailed description of the invention to be read in connection with the accompanying drawings, wherein:

FIG. 1 is a schematic illustration of the internal combustion engine of a vehicle and the throttle control thereof with an accelerator control assembly in accordance with the invention incorporated therein;

FIG. 2 is a top view of the accelerator control assembly of FIG. 1, with parts broken away to show the details of various elements of this assembly;

FIG. 3 is a left-hand end view of the accelerator control assembly of FIG. 2; and, FIG. 4 is a sectional view taken along line 4—4 of FIG. 3.

Referring first to FIG. 1, there is shown the internal combustion engine 10 of a vehicle having a carburetor 11 providing an induction passage 12 in communication with the intake manifold 14 of the engine. A throttle 15, mounted on a throttle shaft 16, is pivotally disposed into the induction passage 12 and is controlled by a throttle lever 17 fixed to the shaft 16. Opening movement of the throttle 15 is effected by the usual driver actuated accelerator pedal 20, while a throttle return spring 21 is used to effect closing movement of the throttle in a well-known manner.

In the embodiment shown schematically in FIG. 1, the foot operated accelerator pedal 20 is pivotally mounted at one end at 22 to a vehicle body member 23 and is pivotally connected to one end of a pivot lever 24 which in turn is pivotably mounted intermediate its ends by a pivot support 25 fixed to the body member 23, the opposite end of the pivot lever 24 being operatively connected to one end of an accelerator rod 26 which slidably extends through the body member 23 with its other end pivotally connected to the throttle lever 17.

With reference to FIG. 1, the vehicle operator in order to effect opening movement of throttle 15 would effect pivotal movement of the accelerator pedal in a clockwise direction which would result in counterclockwise movement of the pivot lever 24. However, in accordance with the invention, the accelerator control assembly, generally designated 30, of the invention provides a movable detent or bumper stop 31 extending from a pivotable lever arm 32 of the assembly into the path of movement of the upper arm portion of pivot lever 24 to thereby resist pivotable movement of this lever in a manner and for a purpose to be described.

In the embodiment of the accelerator control assembly shown, the lever arm 32 carrying the bumper stop 31 is pivotably supported on a suitable support bracket 33 rigidly fixed to the body member 23 of the vehicle. Support bracket 33, in the embodiment shown, consists of four bracket elements suitably secured together into a unitary structure and includes an inverted L-shaped main bracket 34 having an upright arm 34a and a horizontal support arm 34b extending substantially at right angle from the upright arm. A pair of apertured right angle bracket arms 35 are suitably fixed to opposite sides of the lower end of the main bracket 34 whereby this end of the support bracket can be fixed to the body member 23. In addition, an upper bracket element 36 is suitably secured, as by rivets, to the upper end of the upright arm of the main bracket, the upper bracket 36 having an apertured out-turned flange 36a, as seen in FIGS. 2 and 3, to receive a suitable fastener whereby this end of the support bracket can also be secured to a body element of the vehicle as, for example, to the underside of the instrument panel member 37 of the vehicle.

To pivotally support the lever arm 32, there is provided a stepped stub shaft 40, one reduced end of which extends through a suitable aperture in the upright arm 34a of the support bracket 33 and is suitably fixed thereto, as by being staked thereto, whereby the stub shaft extends outward at right angle outward from the upright portion of the main bracket 34 intermediate the ends thereof. As best seen in FIG. 4, the lever arm 32 is pivotally supported on the reduced diameter free end portion of stub shaft 40 by a shouldered bushing 41 that extends through an aperture provided for this purpose in the lever arm, the bushing being loosely sandwiched between a shoulder of the stub shaft on one side thereof and a washer 42 on its other side, the washer 42 being retained against axial movement in one direction by a retainer washer 43 fixed to the end of the stub shaft as by a screw fastener 44 extending therethrough into threaded engagement of the free end of the stub shaft.

The bumper stop 31 carried by the lever arm 32 is in the form of a slotted spool secured by a roll pin 45 to an outwardly bent tab 32a at one end of the lever arm. Rotative positioning of the bumper stop 31 in the path of travel of the pivot lever 24 is controlled by means of a pair of levers 46 and 47, the lever 47 being pivotally carried by lever 46, a coiled spring 48 and a vacuum actuator 60, in a manner to be described.

The lever 46, which is a manually adjustable lever is of substantially L-shape and is pivotally mounted at one end by a pivot pin 50 adjacent to one end of the support arm 34b of the support bracket 33 with a washer 52 loosely sandwiched therebetween. Intermediate its ends, the lever 46 carries a depending pin 51 which slidably extends through an elongated slot 34c in the opposite end of the support arm 34b. As best seen in FIG. 3, a washer 42 encircles the pin 51 between the lever 46 and one side of the support arm 34b and, a second washer 52 encircles the pin 51 on the opposite side of the support arm 34b and is forced into frictional abutment against this side of the support arm 34b by a coiled spring 53 which abuts at one end against this second washer and at its other end against a retainer washer 54 suitably secured to the free end of pin 51. These latter described elements restrain pivotal movement of the lever 46 relative to the support bracket. A lever extension 55 is also adjustably secured at one end to the opposite end of the lever 46 with the opposite end of this extension lever 55 extending through the instrument panel member 37 and a slotted bezel assembly 56 suitably secured to the instrument panel member, as best seen in FIG. 1, whereby the free end of the extension lever 55 is in a position to be manually moved by the vehicle operator for a purpose to be described. The lever 46 also has an upturned flange 46a on which the vacuum actuator 60 is secured.

Vacuum actuator 60 includes a two-piece housing consisting of front and rear casings 61 and 62, respectively, with the diaphragm of a diaphragm assembly 63 securely sandwiched therebetween to form a vacuum chamber 64 connected by a hose conduit 65 in communication with a source of engine induction vacuum pressure downstream of throttle 15 and, a pressure chamber 66 in communication in a suitable manner with the atmosphere. A spring 67 positioned within the vacuum chamber 64 normally biases the diaphragm assembly in a direction toward the flange 46a, toward the position shown in FIG. 2. An actuator rod 68 is fixed at one end to the diaphragm assembly 63 for movement therewith, the opposite end of this rod being pivotably secured to one end of the lever 47, as by having a bent end of this rod extending through a suitable aperture in the lever 47 provided for this purpose.

The lever 47, adjacent to its other end, is pivotably secured by a pivot pin 50 on the top of lever 46 adjacent to the outer extension of a leg of the lever 46 with a washer 52 encircling the pin 50 in loosely sandwiched relationship between the lever 46 and lever 47. With this arrangement, the upstanding abutment leg 47a of the lever 47 is positioned to abut against the bumper stop 31 inboard of the path of travel of pivot lever 24 and on the same side of the bumper stop against which the pivot lever 24 engages.

The lever arm 32 carrying the bumper stop 31 and the abutment 47a of lever 47 are normally biased into engagement with each other by the coiled spring 48 which encircles the stub shaft 40 between the main bracket 34 and lever arm 32, one end 48a of the spring being hooked over a suitable notch in the end of the lever 46 and a notch 47b on the end of lever 47 while the other end 48b of the spring is hooked through one of the apertures 32b provided for this purpose in the lever arm 32 with the spring partly wound-up, whereby the lever arm 32 is normally biased in a rotative direction, toward the abutment, clockwise as seen in FIG. 1, and the lever arms 46 and 47 are normally biased about the axis of their respective pivot pins 50 in a direction whereby the abutment 47a is biased toward the bumper stop, that is, in a clockwise direction with reference to FIG. 2.

Thus, during assembly, the end 48a of spring 48 is first secured over the edges of the levers 46 and 47 and then the spring is partly wound-up around the stub shaft to obtain the torsion force desired and then the end 48b of the spring is inserted in the appropriate aperture 32b in the series of these apertures in the lever arm 32.

Referring again to the vacuum actuator 60, by appropriate sizing of the force of the spring 67, this actuator will be operative above a predetermined induction vacuum pressure during engine operation to effect pivotal movement of the lever 47 in a clockwise direction from the position shown in FIG. 2 as a function of the variation in induction vacuum pressure above the predetermined vacuum pressure. When the vacuum pressure falls below this predetermined pressure value, the spring 67 of the vacuum actuator 60 would then be effective to move the lever in the opposite direction toward the position shown in FIG. 2.

Pivotal movement of the lever 47, as described, will in turn effect unwinding or wind-up of the coiled spring 48, depending on the direction of pivotal movement of the lever 47, as its abutment leg 47a engages the bumper stop 31 thereby effecting corresponding pivotal movement of the lever arm 32. With this arrangement, the bumper stop is thereby moved either in a direction to resist throttle opening movement of the pivot lever 24 or in a direction to permit increased throttle opening movement of the pivot lever 24 before it engages the bumper stop 31. Since the vacuum actuator 60 and lever 47 are both supported by the lever 46, pivotal movement of the lever 46 by the operator will not effect the above described operational movement of the lever 47 by the vacuum actuator 60.

During vehicle operation, the bumper stop 31 acts as a detent against which the pivot lever 32 will abut as the accelerator pedal is actuated by the vehicle operator to effect operation of the throttle valve 15. During vehicle engine operation with the elements of the accelerator control assembly, for example, in the position as shown in FIG. 2, as the operator depresses the accelerator pedal to effect opening of the throttle valve, the pivot lever 24 will pivot substantially freely about the pivot support 25 in a counterclockwise direction, with reference to FIG. 1, until the upper arm portion of the pivot lever 24 engages the bumper stop 31, which engagement is felt by course, operator, thereby, in effect, resisting the amount of acceleration the driver can attain unless, of course, the operator wishes to override the system by applying more pedal pressure to the accelerator pedal 20 whereby to further wind-up the spring 48 through engagement of the pivot lever 24 against the bumper stop 31 on the lever arm 32. This, of couse, will require the operator to intentionally exert the additional pedal pressure to effect this movement. However, if the operator actuates the throttle pedal in a manner to effect a not too rapid rate of acceleration, the engine manifold vacuum level is maintained relatively high and this vacuum pressure, above a predetermined vacuum pressure, acting on one side of the diaphragm 63 of the vacuum actuator 60, with atmospheric pressure acting on the opposite side of the diaphragm, will effect movement of the diaphragm against the force of spring 67 in a direction whereby through its connection with the lever 47 through actuator rod 68, the lever 47 is pivoted about the axis of its pivot pin 50 in a clockwise direction, with reference to FIG. 2, to effect movement of the bumper stop 31 in a direction, to the left with reference to FIG. 2, to allow additional throttle opening as engine speed increases, without the pivot lever 24 engaging the bumper stop 31 and therefore without the necessity of the operator winding-up spring 48. With the arrangement disclosed, the operation of the vehicle can be limited to reasonable acceleration rates in the city but it will still allow higher cruising speeds to be obtained on the open highway with the pivot arm 24 merely abutting against the bumper stop 31 without further winding of the coiled spring 48.

The operator, by adjustment of the lever 46 through manipulation of the extension lever 55, can position the bumper stop 31 to obtain either increased engine economy or increased engine performance, as desired. That is, for maximum engine economy, the lever 46 would be in the position shown in FIG. 2 with the bumper stop 31 positioned as shown to provide limited movement of the pivot lever 24 before it engages the bumper stop 31. It will, however, be apparent that if the extension lever 55 is moved toward the power position, indicated in FIG. 1, by the operator, this movement of the extension lever will effect similar movement of the lever 46 to cause it to pivot clockwise about the axis of its pivot pin 50, with reference to FIG. 2, thereby carrying with it the lever 47 and its abutment leg 47a which, abutting against the bumper stop 31, causes the bumper stop to move to the left in terms of FIG. 2 thereby effecting pivotal movement of the lever arm 32 in a counterclockwise direction, with reference to FIG. 1, with wind-up of spring 48. Bumper stop 31 is thus moved in a direction away from the upright portion of the vehicle body member 23 as seen in FIG. 1 thereby permitting increased pivotal movement of the pivot lever 24 in a counterclockwise direction during opening movement of the throttle 15 before the pivot lever 24 engages the bumper stop, the operation of the remaining components of the subject accelerator control assembly being the same as previously described.

What is claimed is:

1. In an automotive vehicle having an internal combustion engine with an induction system including a movable throttle and a driver operated actuating means operatively connected to the throttle to effect opening movement of the throttle, an accelerator control assembly operative to provide a force signal to the vehicle operator indicating proper throttle settings for economical engine operation, said accelerator control assembly including a support means, a shiftable bumper stop means pivotably supported by said support means and positioned in the path of movement of said actuating means and engageable by said actuating means when said actuating means is moved to effect opening movement of the throttle, a manually adjustable lever pivotably supported on said support means, a lever means pivotably supported on said lever with one end of said lever means positioned to abut against said bumper stop means, a vacuum actuator having an actuator rod operatively connected to said lever means to normally pivot said lever means in a first direction to allow pivotal movement of said bumper stop means in a direction to resist throttle opening movement of said actuating means, said vacuum actuator having a chamber connected to the induction system of the engine downstream of the throttle for applying induction vacuum pressure to the vacuum actuator whereby at a predetermined vacuum pressure said vacuum actuator will effect pivotal movement of said lever means in a second direction to effect pivotal movement of said bumper stop means in a direction to permit increased throttle opening movement of said actuating means and, coiled spring means operatively connected at one end to said bumper stop means and at its other end to said lever and to said lever means to normally bias said bumper stop means in a direction to resist throttle opening movement of said actuating means and to effect pivotal movement of said lever and said lever means in a direction for said one end of said lever means to abut against said bumper stop means.

2. An accelerator control assembly for an internal combustion engine of a vehicle having an induction system including a movable throttle for controlling flow through an induction passage and a manually actuated accelerator linkage means including a pivot lever pivotable about a pivot support and operatively connected to the throttle to effect opening movement of the throttle, said accelerator control assembly being operative to assist the operator of the engine to obtain improved fuel economy and including a lever arm having a bumper stop extending therefrom, a support bracket means pivotably supporting said lever arm with said bumper stop adjustably positioned in the path of travel of the pivot lever for engagement thereby, a manually operable first lever pivotally supported adjacent one end on said support bracket, a second lever having an abutment arm at one end thereof, said second lever being pivotably supported intermediate its ends on said first lever adjacent said one end thereof with said abutment arm of said second lever positioned to abut against said bumper stop, a wound coiled spring means operatively connected at one end to said lever arm and at its opposite end to said first lever and to said second lever to normally bias said lever arm and said first lever and said second lever in directions whereby said abutment arm engages against said bumper stop and, power means supported by said support bracket means and operatively connected to said second lever to normally pivotably bias said second lever and therefore said abutment arm in a first direction corresponding to the pivotal direction of movement of said bumper stop on said lever arm as biased by said coiled spring, said power means being operable to effect pivotal movement of said second lever in a direction to effect by engagement of said abutment stop with said bumper stop pivotal movement of said bumper stop in a direction to further wind-up said coiled spring.

3. An accelerator control assembly according to claim 2 wherein said power means is a vacuum actuator having a housing fixed to said first lever for movement therewith, a diaphragm means in said housing forming with said housing a first chamber operatively connectable to the induction system of the engine downstream of the throttle and a second chamber in communication with the atmosphere, an actuator rod operatively connected at one end to said diaphragm means and at its opposite end pivotally connected to said second lever, a spring means positioned in said first chamber in abutment with said diaphragm means to bias said diaphragm means and therefore said second lever toward said first position.

4. An accelerator control assembly according to claim 2 further including biasing means associated with said support bracket means and with said first lever to adjustably restrain pivotal movement of said first lever relative to said support bracket means.

5. An accelerator control assembly for the internal combustion engine of a vehicle having an induction system including a movable throttle for controlling flow through an induction passage and a manually actuated accelerator linkage means including a pivot lever pivotable about a pivot support and operatively connected to the throttle to effect opening movement of the throttle, said accelerator control assembly being operative to provide a force signal to the vehicle operator to indicate proper throttle settings during acceleration of the vehicle and including a lever arm having a bumper stop extending therefrom, a support bracket means including a stub shaft and a support arm extending in spaced parallel relation to said stub shaft, said lever arm being pivotally supported on said stub shaft with said bumper stop adjustably positioned in the path of travel of the pivot lever for engagement thereby, a manually operated first lever pivotally supported on said support arm adjacent one end of said support arm, elongated slot means in said support arm adjacent to the opposite end of said support arm, pin means fixed intermediate the ends of said first lever in position for said pin to extend through said elongated slot on said support arm, spring biased means operatively supported on said pin for engagement with said support arm to restrain said first lever against free pivotal movement relative to said support arm, a second lever having an abutment arm at one end thereof, said second lever being pivotally supported intermediate its ends on said first lever adjacent one end thereof with said abutment arm of said second lever positioned for abutment against said bumper stop, a wound coiled spring encircling said stub shaft with one end of said spring connected to said lever arm and its opposite end operatively connected to said first lever and to said second lever whereby to normally bias said abutment arm against said bumper stop, a vacuum actuator having a housing fixed to said first lever for movement therewith, a diaphragm means in said housing forming with said housing a first chamber operatively connectable to the induction system of the engine downstream of the throttle and a second chamber in communication with the atmosphere, an actuator rod operatively connected at one end to said diaphragm means and at its opposite end pivotally connected to said second lever, a spring means positioned in said first chamber to abut against said diaphragm means to effect movement of said diaphragm means and through said actuator rod, said second lever in a pivotable direction corresponding to the direction of pivotal movement of said lever arm as biased by said coiled spring, said vacuum actuator being operable to effect pivotal movement of said second lever in a direction to effect, by engagement of said abutment stop against said bumper stop, pivotal movement of said lever arm in a direction to unwind said coiled spring thereby effecting adjustable positioning of said bumper stop in the path of travel of the pivot lever of the accelerator linkage means.

* * * * *